(12) United States Patent
Rahman

(10) Patent No.: US 11,777,652 B1
(45) Date of Patent: Oct. 3, 2023

(54) METHOD TO IMPROVE TCP COMMUNICATION FOR WIRELESS WITH MULTI-SOCKET TCP VERSUS SINGLE SOCKET

(71) Applicant: T-Mobile Innovations LLC, Overland Park, KS (US)

(72) Inventor: Muhammad Tawhidur Rahman, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/363,796

(22) Filed: Jun. 30, 2021

(51) Int. Cl.
*H04L 1/08* (2006.01)
*H04L 49/00* (2022.01)
*H04L 49/20* (2022.01)
*H04W 80/06* (2009.01)

(52) U.S. Cl.
CPC .............. *H04L 1/08* (2013.01); *H04L 49/206* (2013.01); *H04L 49/30* (2013.01); *H04W 80/06* (2013.01)

(58) Field of Classification Search
CPC ......... H04L 1/08; H04L 49/206; H04L 49/30; H04W 80/06
See application file for complete search history.

(56) References Cited

U.S. PATENT DOCUMENTS

| 2012/0226802 A1* | 9/2012 | Wu ......................... H04L 47/27 709/224 |
| 2013/0077501 A1* | 3/2013 | Krishnaswamy ....... H04L 45/24 370/252 |
| 2015/0049667 A1* | 2/2015 | Oda ...................... H04W 80/06 370/328 |
| 2016/0309534 A1* | 10/2016 | Teyeb ................. H04L 61/5007 |
| 2017/0187497 A1* | 6/2017 | Walid ...................... H04L 69/16 |
| 2018/0103123 A1* | 4/2018 | Skog ...................... H04L 69/14 |
| 2019/0158353 A1* | 5/2019 | Johnson .............. H04L 41/0803 |
| 2019/0306068 A1* | 10/2019 | Kiss ...................... H04W 36/08 |
| 2019/0327135 A1* | 10/2019 | Johnson ................. H04L 67/34 |
| 2021/0143890 A1* | 5/2021 | Legg .................... H04B 7/0617 |
| 2022/0116822 A1* | 4/2022 | Sahin ..................... H04L 45/24 |

OTHER PUBLICATIONS

3GPP, "TS 23.501—System architecture for the 5G System (5GS)." Technical Specification, Release 16, Version 16.6.0 (Sep. 2020): 1-447 (Year: 2020).*

* cited by examiner

*Primary Examiner* — Kent Krueger
(74) *Attorney, Agent, or Firm* — Shook, Hardy & Bacon L.L.P.

(57) ABSTRACT

The technology described herein provides for optimizing communications, such as Real-time network services, by using multiple TCP ports. In embodiments, a user device sends a data packet using a first TCP port, determines that the data packet has not been received by a receiving device, and uses a second TCP port to re-send the data packet. In addition or alternatively, the user device can determine the availability of additional TCP ports for re-sending data if the user device determines that the data packet sent using the first TCP port has not been received. Through this technology, the user device will be able to alleviate the reduction in quality of or outright failure of its real-time network services.

20 Claims, 4 Drawing Sheets

METHOD TO IMPROVE TCP COMMUNICATION FOR WIRELESS WITH MULTI-SOCKET TCP VERSUS SINGLE SOCKET

SUMMARY

The present disclosure is directed, in part, to improving communications by using multiple TCP ports, substantially as shown in and/or described in connection with at least one of the figures, and as set forth more completely in the claims.

Real-time network services, including Voice over LTE (VoLTE), Voice over 5G radio (VoNR), 911 call over VoLTE, 5G New Radio (NR), and Rich Communication Services (RCS) messaging, are designed to deliver real-time information with a high quality of service in a timely manner. In conventional communication systems, a user device utilizes a single transmission control protocol (TCP) port for session setup of a real-time network service. From time to time, a user device utilizing one or more real-time network services can lose radio connection with a mobile network, such as but not limited to when the user device is located on a cell edge of a mobile network or in a fringe area where signal reception is weak and/or subject to distortion. Once the user device regains a radio connection, however, the TCP port that the user device is utilizing may no longer be available for setting up a real-time network service between the user device and the mobile network. As such, the user device may experience a reduction in the quality of or outright failure of one or more of its real-time network services. By using a particular methodology that allows for the use of multiple TCP ports, however, the user device will be able to alleviate this reduction in quality of or outright failure of its real-time network services.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the present invention are described in detail below with reference to the attached figures, which are intended to be exemplary and non-limiting, wherein.

DETAILED DESCRIPTION

Figure 1:
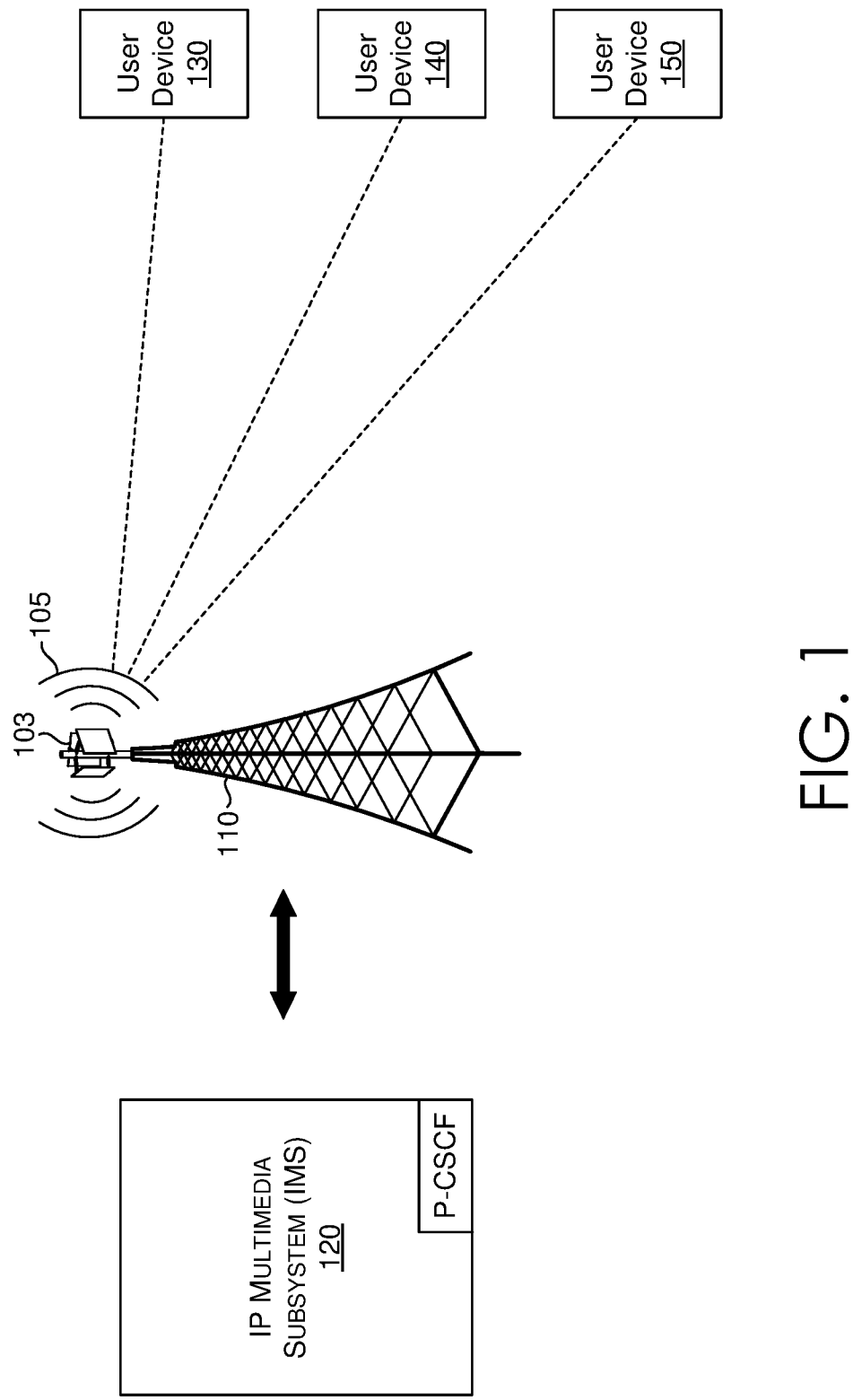
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for improving communications by using multiple TCP ports. A data packet is sent using a first TCP port of a plurality of TCP ports. A determination is made that the data packet sent using the first TCP port of the plurality of TCP ports was not received by a receiving device. The data packet is re-sent using a second TCP port of the plurality of TCP ports, wherein the second TCP port is different from the first TCP port. Advantageously, by allowing the use of a plurality of TCP ports to transmit a given data packet, reduction in the quality of or outright failure of real-time network services can be avoided.

In other aspects, other methods are provided for improving communications by using multiple TCP ports. A data packet is sent using a first TCP port of a plurality of TCP ports. A determination is made that the data packet sent using the first TCP port of the plurality of TCP ports was not received. A second TCP port from the plurality of TCP ports, which is different from the first TCP port, is identified as being available to send the data packet. The data packet is re-sent using the second TCP port of the plurality of TCP ports that has been determined to be available.

In certain aspects, a non-transitory computer readable medium having stored thereon executable instructions is provided that when executed by a processor of a computing device controls the computing device to perform certain steps. The processor causes the computing device to send a packet of information using one of a plurality of TCP ports. The processor also causes the computing device to determine that the packet of information sent using said one of the plurality of TCP ports was not received by a receiving device and re-send the packet of information using a second one of the plurality of TCP ports wherein the second TCP port is different from the first TCP port.

In other aspects, another non-transitory computer readable medium having stored thereon executable instructions is provided that when executed by a processor of a computing device controls the computing device to perform certain steps. The processor causes the computing device to send a packet of information using one of a plurality of TCP ports. The processor also causes the computing device to determine that the packet of information sent using said one of the plurality of TCP ports was not received by a receiving device, identify a second TCP port from the plurality of TCP ports that has availability to send the data packet, wherein the first TCP port is different than the second TCP port, and re-send the packet of information using the second TCP port of the plurality of TCP ports that has been determined to have availability.

In certain aspects, a user equipment (UE) device is provided in a communication network for improving communications by using multiple TCP ports. The UE device is configured to send a packet of information using one of a plurality of TCP ports. The UE device is also configured to determine that the packet of information sent using said one of the plurality of TCP ports was not received by a receiving device. The UE device is further configured to re-send the packet of information using a second one of the plurality of TCP ports.

In other aspects, another UE device is provided in a communication network for improving communications by using multiple TCP ports. The UE device is configured to send a packet of information using one of a plurality of TCP ports. The UE device is also configured to determine that the packet of information sent using said one of the plurality of TCP ports was not received by a receiving device. The UE device is further configured to identify a second TCP port from the plurality of TCP ports that has availability to send the data packet, wherein the first TCP port is different from the second TCP port. And the UE device of configured to re-send the packet of information using the second TCP port of the plurality of TCP ports that has been determined to have availability.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, device, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE devices. The network may comprise one or more base stations, i.e. cell sites equipped with radio equipment, a backhaul network connecting one or more base stations to a core network, a database, a power supply, sensors, and other components not discussed herein, in various embodiments.

The terms "base station" and "cell site" may be used interchangeably herein to refer to a defined wireless communications coverage area (i.e., a geographic area) serviced by a base station. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE devices that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," "user device," and "UE device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100, including the IP Multimedia Subsystem (IMS) 120, provides services, including real time services, such as Voice over LTE (VoLTE), Voice over 5G radio (VoNR), 911 call over VoLTE, 5G New Radio (NR), and Rich Communication Services (RCS) messaging, to one or more user devices 130, 140, and 150. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. The cell site 110 may include one or more antennas 103, base transmitter stations, radios, transmitter/receivers, digital signal processors, control electronics, GPS equipment, power cabinets or power supply, base stations, charging stations, etc. such that the cell site 110 may provide a communication link between the one or more user devices 130, 140, and 150 and other components, systems, equipment, and/or devices of the network environment 100.

In some embodiments, the user devices 130, 140, and/or 150 may take the form of a wireless or mobile device capable of communication via the network environment 100. For example, the user device 130 may take the form of a mobile device capable of communication via a telecommunication network such as, but not limited to, a wireless telecommunication network. In this regard, the user device may be any mobile computing device that communicates by way of a network, for example, a 1× circuit voice network, a 3G network (e.g., CDMA, CDMA 2000, WCDMA, GSM, UMTS, a 4G network (LTE, WiMAX, HSDPA), a 5G network, a 6G network, or any other type of network.

In some embodiments, the network environment 100 may be structured to connect subscribers to a service provider or a plurality of service providers. Alternatively or additionally, the network environment 100 may be associated with a specific telecommunication provider that provides services (e.g. 5G, voice, location, etc.) to one or more user devices 130, 140, and/or 150. For example, the user devices 130, 140, and 150 may be subscribers to a telecommunication service provider, in which the user devices 130, 140, and 150 are registered or subscribed to receive voice and data services over the network environment 100. The network environment 100 may include any communication network providing voice and/or data service(s), such as, for example, a 1× circuit voice, a 3G network (e.g., CDMA, CDMA 2000, WCDMA, GSM, UMTS, a 4G network (LTE, WiMAX, HSDPA), a 5G network, or 6G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
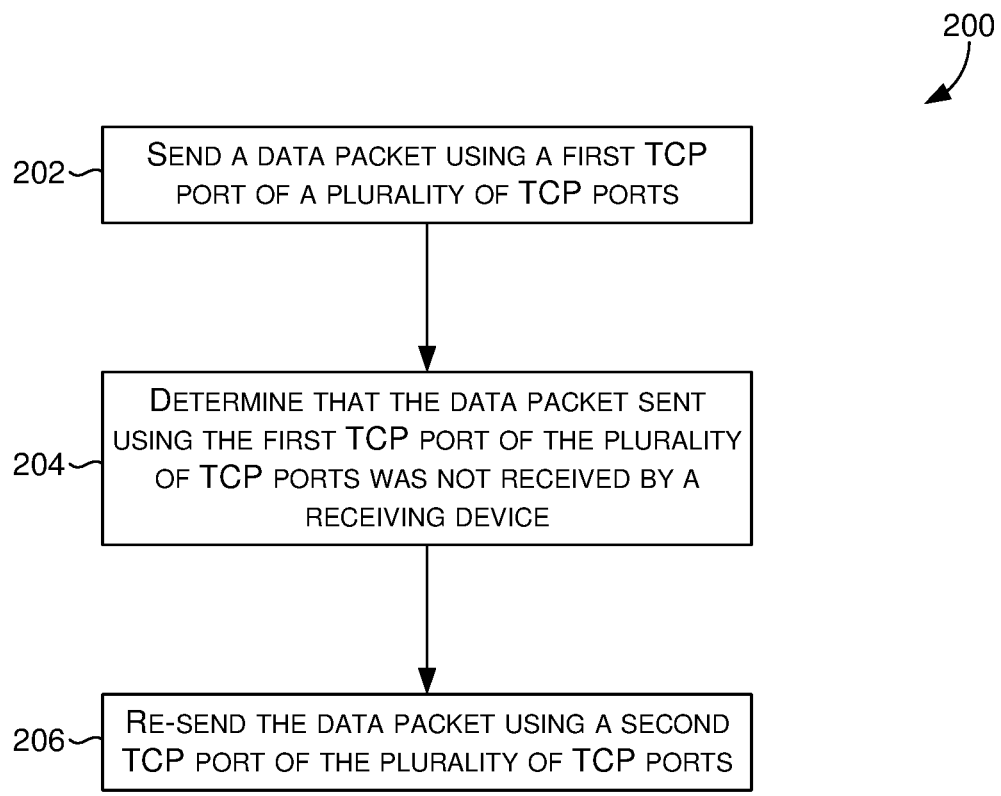
FIG. 2 depicts a flowchart of an exemplary method for selecting multiple TCP ports in accordance with an example embodiment.

FIG. 2 depicts a flow diagram of an exemplary method 200 for improving communications by using multiple TCP ports in accordance with implementations of the present disclosure. Initially, at block 202, a UE device sends a data packet using a first TCP port of a plurality of TCP ports. For example and without limitation, a UE device may send a data packet, in the form of an SIP INVITE request, using Port number 5060 or 5061. A port number represents a communication endpoint that identifies a specific process or service. The Internet Assigned Numbers Authority ("IANA") manages and regulates Port number assignments. Currently, there are over 65,000 port numbers, which are categorized as follows:

| Port Number Range | Type |
|---|---|
| 0-1023 | Well-Known Ports |
| 1024-49151 | Registered Ports |
| 49152-65565 | Dynamic Ports |

At block 204, a UE device determines that the data packet sent using the first TCP port was not received by a receiving device. For example and without limitation, after the UE device sends the data packet, such as but not limited to, a SIP INVITE request, the UE device determines that the data packet sent using the first TCP port was not received, such as but not limited to, if the UE device does not receive a 200 OK message in response.

Once the UE device determines that the data packet sent using the first TCP port was not received, the UE device may use a different TCP port. In specific embodiments, the UE device may utilize another TCP port different from the first port number within the range of Registered Port numbers or Dynamic Port numbers. In certain embodiments, the UE device can be pre-configured with a plurality of TCP port numbers that can be used to re-send a data packet when it is determined that the data packet sent using the first TCP was not received. At block 206, the UE device re-sends the data packet using the second TCP port.

In some embodiments, the UE device determines that the data packet sent using the second TCP port of the plurality of TCP ports was not received by a receiving device. The UE device then re-sends the data packet using a third TCP port of the plurality of TCP ports. In further embodiments, the second TCP port is a Registered port and the third TCP port is a Dynamic port. And in still further embodiments, the third TCP port is a Dynamic port in the range of 60000-65565. The UE device in other embodiments can be pre-configured with at least two TCP ports that are ranked as a first port, second port, etc. When the UE device determines that a data packet has not been received, it utilizes the TCP port ranked as the first port to send the data packet. When the UE device determines that the data packet has not been received using the TCP port ranked as the first port, it utilizes the TCP port ranked as the second port to re-send the data packet.

Figure 3:
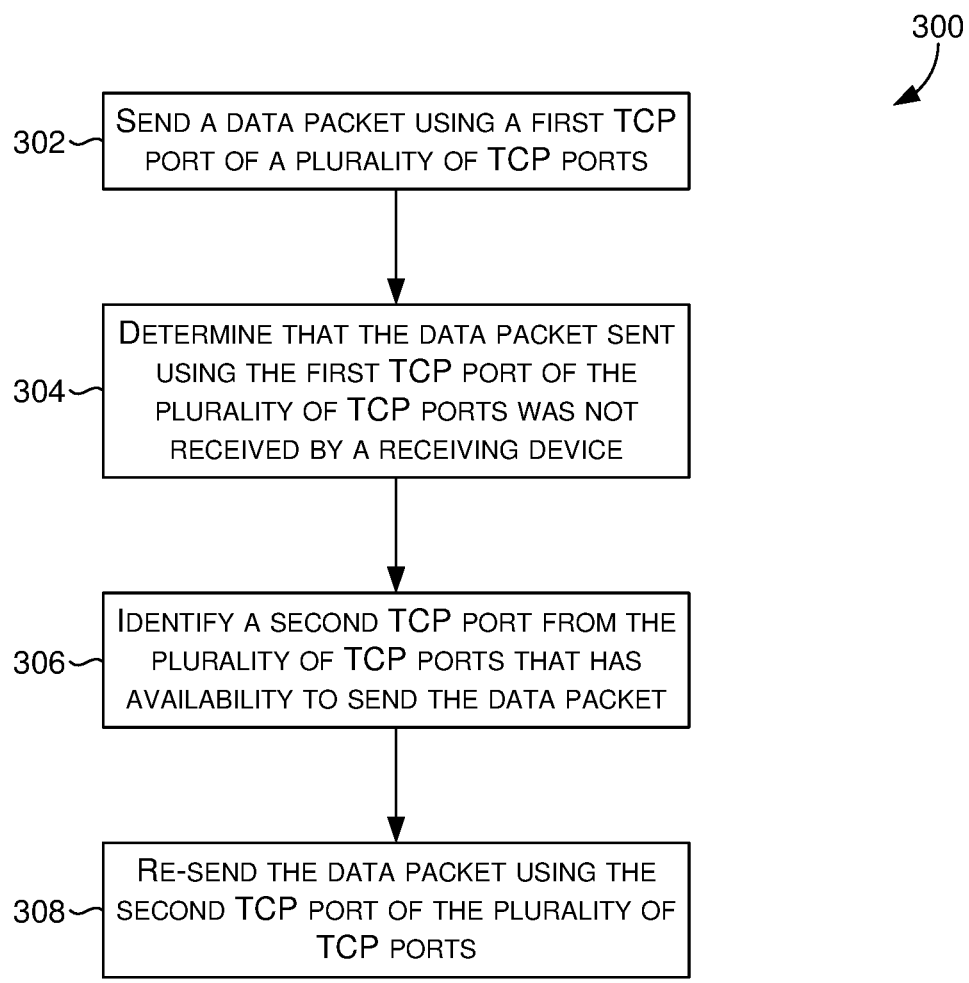
FIG. 3 depicts a flowchart of another exemplary method for selecting multiple TCP ports in accordance with an example embodiment.

FIG. 3 depicts a flow diagram of an exemplary method 300 for improving communications by using multiple TCP ports in accordance with implementations of the present disclosure. At block 302, a UE device sends a data packet using a first TCP port of a plurality of TCP ports. The UE device determines that the data packet sent using the first TCP port of the plurality of TCP ports was not received by a receiving device at block 304. In specific embodiments, the receiving device can be a Proxy Call Session Control Function (P-CSCF). At block 304, the UE device identifies a second TCP port from the plurality of TCP ports that has availability to send the data packet, wherein the first TCP port is different from the second TCP port. In certain embodiments, the UE device at block 306 identifies one or more TCP ports that are available for sending the data packet. At block 308, the UE device re-sends the data packet using the second TCP port of the plurality of TCP ports that has been determined to have availability that is different from the first port number. In specific embodiments, the second port number is within the range of Registered Port numbers or Dynamic Port numbers.

In other embodiments, the UE device determines that the second TCP port is not available to send the data packet. The UE device identifies a third TCP port from the plurality of TCP ports that has availability to send the data packet, wherein the first, second, and third TCP ports are different. The UE device then re-sends the data packet using the third TCP port. In specific embodiments, the second TCP port is a Registered port and the third TCP port is a Dynamic port.

In certain embodiments, the UE device is equipped with a retry timer. When a UE determines within a certain time period between anywhere from approximately 500 milliseconds to 16 seconds, that a data packet has not been received by a receiving device on a first TCP port, it re-sends the data packet using a second TCP port. In other embodiments, when a UE device determines within a certain time period between anywhere from approximately 500 milliseconds to 16 seconds that the data packet using the second TCP port has not been received by a receiving device on a second TCP port, it re-sends the data packet using a third TCP port.

Figure 4:
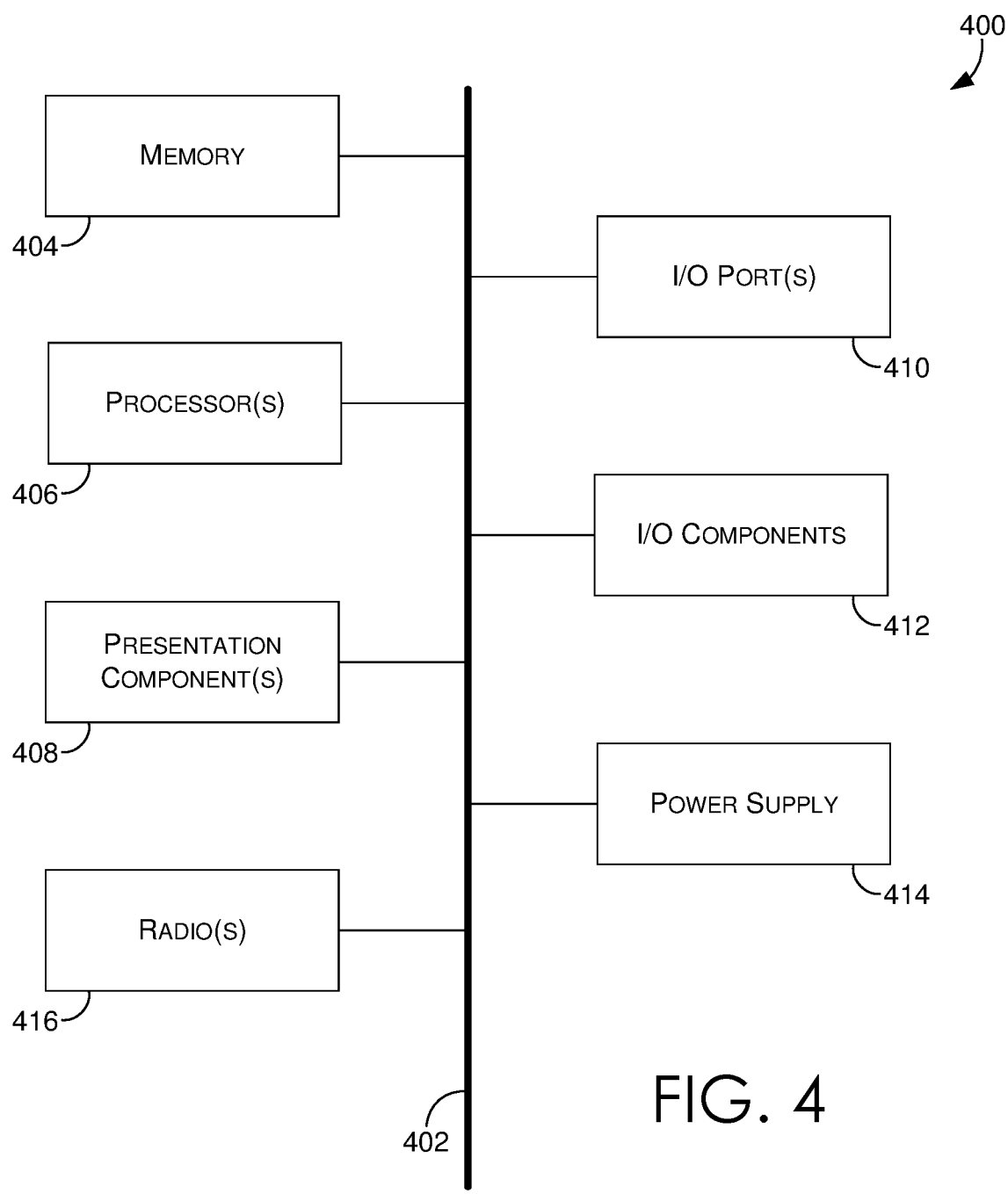
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be a UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 400 includes a bus 402 that directly or indirectly couples various components together. The bus 402 may directly or indirectly one or more of memory 404, processor(s) 406, presentation component(s) 408 (if applicable), radio(s) 416, input/output (I/O) port(s) 410, input/output (I/O) component(s) 412, and/or power supply 414. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 412. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 416 represents one or more radios that facilitate communication with a wireless telecommunication network. For example, radio(s) 416 may be connected to one or more antenna elements through a physical path. Illustrative wireless telecommunications technologies include CDMA, GPRS, TDMA, GSM, and the like. Radio(s) 416 might additionally or alternatively facilitate other types of wireless communications including Wi-Fi, WiMAX, 3G, 4G, LTE, GSM, mMIMO, 5G, 6G, NR, VoLTE, and/or other VoIP communications. Components such as a base station, a communications tower, or even access points (as well as other components) can provide wireless connectivity in some embodiments.

The input/output (I/O) ports 410 may take a variety of forms. Exemplary I/O ports 410 may include a USB jack, a stereo jack, an infrared port, a firewire port, other proprietary communications ports, and the like. Input/output (I/O) components 412 may comprise keyboards, microphones, speakers, touchscreens, and/or any other item usable to directly or indirectly input data into the computing device 400.

Power supply 414 may include batteries, fuel cells, and/or any other component that may act as a power source to supply power to the computing device 400 or to other network components, including through one or more electrical connections or couplings. Power supply 414 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A method for improving communications by using multiple TCP ports, the method comprising:
    sending a data packet using a first pre-configured and ranked first TCP port of a plurality of pre-configured and ranked of TCP ports;
    determining that the data packet sent using the first TCP port of the plurality of TCP ports was not received by a receiving device; and
    re-sending the data packet using a second TCP port of the plurality of TCP ports, wherein the second TCP port is different than the first TCP port and further wherein the second TCP port is ranked second of the pre-configured and ranked TCP ports.

2. The method of claim 1, wherein the second TCP port is a registered port.

3. The method of claim 1, wherein the second TCP port is a dynamic port.

4. The method of claim 1, further comprising:
    determining that the data packet sent using the second TCP port of the plurality of TCP ports was not received by a receiving device; and
    re-sending the data packet using a third TCP port of the plurality of TCP ports, wherein the third TCP port is different from the first TCP port and the second TCP port.

5. The method of claim 4, wherein the second TCP port is a registered port and the third TCP port is a dynamic port.

6. A user equipment (UE) device in a communication network for improving communications by using multiple TCP ports, the UE device configured to:
    send a data packet using one of a plurality of pre-configured and ranked TCP ports, wherein the plurality of pre-configured and ranked TCP ports are ranked in order of utilization for re-sending the data packet;

determine that the data packet sent using said one of the plurality of TCP ports was not received by a receiving device; and re-send the data packet using a second one of the plurality of TCP ports, wherein the second TCP port is different than the first TCP port, wherein the second TCP port is ranked second of the pre-configured and ranked TCP ports.

7. The user equipment (UE) device of claim 6, wherein the second TCP port is a registered port.

8. The user equipment (UE) device of claim 6, wherein the second TCP port is a dynamic port.

9. The user equipment (UE) device of claim 6, further configured to:

determine that the data packet sent using the second TCP port of the plurality of TCP ports was not received by a receiving device; and re-send the data packet using a third TCP port of the plurality of TCP ports, wherein the third TCP port is different than the first TCP port and the second TCP port.

10. The user equipment (UE) device of claim 9, wherein the second TCP port is a registered port and the third TCP port is a dynamic port.

11. A method for improving communications using multiple TCP ports, the method comprising:

sending a data packet using one of a plurality of pre-configured and ranked TCP ports, wherein the plurality of pre-configured and ranked TCP ports are ranked in order of utilization for re-sending the data packet;

determining that the data packet sent using said one of the plurality of TCP ports was not received by a receiving device;

identifying a second TCP port from the plurality of TCP ports that has availability to send the data packet, wherein the second TCP port is different than the first TCP port; and re-send the data packet using a second one of the plurality of TCP ports, wherein the second TCP port is different than the first TCP port, wherein the second TCP port is ranked second of the pre-configured and ranked TCP ports.

12. The method of claim 11, wherein the second TCP port is a registered port.

13. The method of claim 11, wherein the second TCP port is a dynamic port.

14. The method of claim 11, further comprising:

determining that the data packet sent using the second TCP port of the plurality of TCP ports was not received by a receiving device;

identifying a third TCP port from the plurality of TCP ports that has availability to send the data packet, wherein the first, second, and third TCP ports are different; and re-sending the data packet using the third TCP port of the plurality of TCP ports, wherein the third TCP port is different from the first TCP port and the second TCP port.

15. The method of claim 11, wherein the second TCP port is a registered port and the third TCP port is a dynamic port.

16. The method of claim 11, wherein a pre-determined time period is used to determine that the data packet was not received by the receiving device.

17. The method of claim 16, wherein the pre-determined time period is between 500 milliseconds and 16 seconds.

18. The method of claim 17, wherein the third TCP port is pre-configured and ranked.

19. The method of claim 18, wherein the third TCP port is a registered port.

20. The method of claim 18, wherein the third TCP port is a dynamic port.

* * * * *